US009950691B2

United States Patent
Kameyama et al.

(10) Patent No.: US 9,950,691 B2
(45) Date of Patent: Apr. 24, 2018

(54) VEHICLE CONTROL SYSTEM (71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Yuuto Kameyama, Kariya (JP); Yuya Goto, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/539,040

(22) PCT Filed: Dec. 22, 2015

(86) PCT No.: PCT/JP2015/006406
§ 371 (c)(1),
(2) Date: Jun. 22, 2017

(87) PCT Pub. No.: WO2016/113820
PCT Pub. Date: Jul. 21, 2016

(65) Prior Publication Data
US 2018/0022315 A1 Jan. 25, 2018

(30) Foreign Application Priority Data
Jan. 16, 2015 (JP) .................................. 2015-006957

(51) Int. Cl.
B60R 25/24 (2013.01)
E05F 15/76 (2015.01)
E05B 81/78 (2014.01)

(52) U.S. Cl.
CPC .............. *B60R 25/24* (2013.01); *E05B 81/78* (2013.01); *E05F 15/76* (2015.01); *E05Y 2900/531* (2013.01)

(58) Field of Classification Search
CPC .......... B60R 25/24; E05F 15/76; E05B 81/78; E05Y 2900/531
(Continued)

(56) References Cited

U.S. PATENT DOCUMENTS

2007/0115096 A1 5/2007 Suzuki et al.
2007/0120645 A1 5/2007 Nakashima
(Continued)

FOREIGN PATENT DOCUMENTS

JP 2007138471 A 6/2007
JP 2007146441 A 6/2007
(Continued)

*Primary Examiner* — Allen T Cao
(74) *Attorney, Agent, or Firm* — Harness, Dickey & Pierce, P.L.C.

(57) ABSTRACT

A vehicle control system includes an in-vehicle device and a portable device. The in-vehicle device includes an in-vehicle communication portion. The in-vehicle communication portion transmits a regular collation signal searching the portable device, and receives a regular response signal, and receives reservation information reserving opening of an arbitrary door. The in-vehicle device includes a collation portion that collates an ID code with a master code. The in-vehicle communication portion transmits an event collation signal, and receives an event response signal. The collation portion collates the ID code with the master code. The in-vehicle device includes an output portion and an intention determination portion. The portable device includes a portable device communication portion and an operation portion and a storage portion and a notification portion. The portable device communication portion transmits the regular response signal, and transmitting the reser- (Continued)

vation information. The portable device communication portion transmits the event response signal.

6 Claims, 8 Drawing Sheets

(58) Field of Classification Search
USPC .................................................. 340/5.6–5.65
See application file for complete search history.

(56) References Cited

U.S. PATENT DOCUMENTS

| | | |
|---|---|---|
| 2009/0224879 A1 | 9/2009 | Nakazawa et al. |
| 2010/0275518 A1 | 11/2010 | Nakazato |
| 2014/0286644 A1* | 9/2014 | Oshima .................. H04B 10/11 398/118 |

FOREIGN PATENT DOCUMENTS

| | | |
|---|---|---|
| JP | 2009209659 A | 9/2009 |
| JP | 2010254215 A | 11/2010 |
| JP | 2014141804 A | 8/2014 |
| WO | WO-2014125650 A1 | 8/2014 |

* cited by examiner

VEHICLE CONTROL SYSTEM

CROSS REFERENCE TO RELATED APPLICATIONS

This application is a U.S. National Phase Application under 35 U.S.C. 371 of International Application No. PCT/JP2015/006406 filed on Dec. 22, 2015 and published in Japanese as WO 2016/113820 A1 on Jul. 21, 2016. This application is based on and claims the benefit of priority from Japanese Patent Application No. 2015-006957 filed on Jan. 16, 2015. The entire disclosures of all of the above applications are incorporated herein by reference.

TECHNICAL FIELD

The present disclosure relates to a vehicle control system.

BACKGROUND ART

There has been known a keyless entry system capable of performing lock/unlock (lock or unlock) of a door, or opening/closing (opening or closing) of a power slide door by operating an operation portion provided in a portable device carried by the user in the vicinity of a vehicle without the necessity of contact with the vehicle. There has also been known a smart entry system (called electronic key system as well) which controls lock or unlock of each door and a start of an engine, based on a collation result of an ID code obtained through bidirectional communication between a portable device and a vehicle side unit.

For improving convenience of these systems, there has been further developed such an electronic key system which opens a slide door which is an opening/closing target in a reservation mode set by operating an electronic key, based on a collation result of an ID code obtained through bidirectional communication between the electronic key and a vehicle side unit when a user approaches a vehicle and stops by the vehicle (see Patent Literature 1). The reservation mode of the electronic key is canceled after completion of opening of the door.

There has also been developed a vehicle door opening/closing device which automatically unlocks and opens a door under a "door opening/closing instruction" set for a portable device carried by a user when the user approaches a vehicle, and automatically closes and locks the door while canceling the setting of the "door opening/closing instruction" of the portable device in response to stop of communication between the vehicle and the portable device after the user gets off and goes away from the vehicle (see Patent Literature 2).

There has been still further developed a vehicle door control system which unlocks and automatically opens a door under an "automatic door opening instruction" set for a portable device carried by a user when the user approaches a vehicle, and automatically closes and locks the door while deleting stored contents concerning the "automatic door opening instruction" of the portable device in response to stop of communication between the vehicle and the portable device after the user goes away from the vehicle (see Patent Literature 3).

There has been still further developed an in-vehicle device control system which stores results of collation between an in-vehicle device and a portable device at the time of opening and closing of a door, performs collation between the in-vehicle device and the portable device before a door lock operation, and locks the door when it is determined that any of the collation results is correct (see Patent Literature 4). This system deletes the stored collation results and stores new collation results at the time of opening or closing of the door.

PRIOR ART LITERATURES

Patent Literatures

Patent Literature 1: JP 2014-141804 A
Patent Literature 2: JP 2007-138471 A
Patent Literature 3: JP 2009-209659 A
Patent Literature 4: JP 2007-146441 A

SUMMARY OF INVENTION

According to Patent Literature 1, the reservation mode of the electronic key is canceled only by reception of a door opening completion signal. More specifically, when the user carrying the electronic key goes away from the vehicle (that is, from transmission range of door opening completion signal) before complete opening of the slide door, the slide door opens at the time of a subsequent approach of the user to the vehicle and a stop at. Accordingly, the user is required to stay at the position until complete opening of the slide door to cancel the reservation mode.

According to Patent Literature 2 and Patent Literature 3, reservation information (setting contents of door opening/closing instruction) is deleted when communication between the vehicle and the portable device is stopped. However, the reservation information is not deleted under a condition that a parking position of the vehicle and a destination are located close to each other, such as an environment of a residence, and the communication between the vehicle and the portable device is not stopped. Accordingly, the door is automatically opened or closed every time the user approaches the vehicle.

Patent Literature 4 is aimed at securer locking of a door, and does not mention automatic opening of a door.

It is an object of the present disclosure to provide a vehicle control system capable of securely performing automatic opening of a door based on reservation information.

A vehicle control system according to one aspect of the present disclosure includes an in-vehicle device that is mounted on a vehicle, and a portable device that is carried by a user. The in-vehicle device includes an in-vehicle communication portion that communicates with the portable device. The in-vehicle communication portion transmits a regular collation signal searching the portable device at a predetermined transmission timing, and receives a regular response signal transmitted from the portable device in response to the regular collation signal, and receives reservation information reserving opening of an arbitrary door of the vehicle. The in-vehicle device further includes a collation portion that collates an ID code with a master code stored beforehand, the ID code being included in the regular response signal and identifying the portable device. The in-vehicle communication portion transmits an event collation signal, which is different from the regular collation signal, at a time of reception of the reservation information, and receives an event response signal transmitted from the portable device in response to the event collation signal. The collation portion collates the ID code included in the event response signal with the master code. The in-vehicle device further includes an output portion that outputs a control command unlocking the door when a collation result at a time of reception of the event response signal is correct. The in-vehicle device further includes an intention determination portion that determines a presence or absence of door opening intention of the user for opening the door when the collation result at the time of reception of the event response signal is correct. The output portion outputs a control command opening the door when the intention determination portion determines that the door opening intention is present. The portable device includes a portable device communication portion that communicates with the in-vehicle device. The portable device includes an operation portion that receives an operation input from the user to register the reservation information. The portable device includes a storage portion that stores the reservation information. The portable device includes a notification portion that notifies the user of a state of the portable device. The portable device communication portion transmits the regular response signal including the ID code at a time of reception of the regular collation signal, and then transmitting the reservation information when the reservation information is stored. The portable device communication portion transmits the event response signal including the ID code at a time of reception of the event collation signal.

According to this configuration, automatic opening of the door caused only by an approach to the vehicle is prevented by transmission of the regular collation signal and the event collation signal in accordance with a search status of the portable device. In addition, automatic opening of the door is performed only when a collation result at the time of reception of the event response signal is correct, and therefore operations of other vehicles are not influenced. The vehicle control system of the present disclosure securely performs automatic opening of a door based on reservation information.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Figure 1:
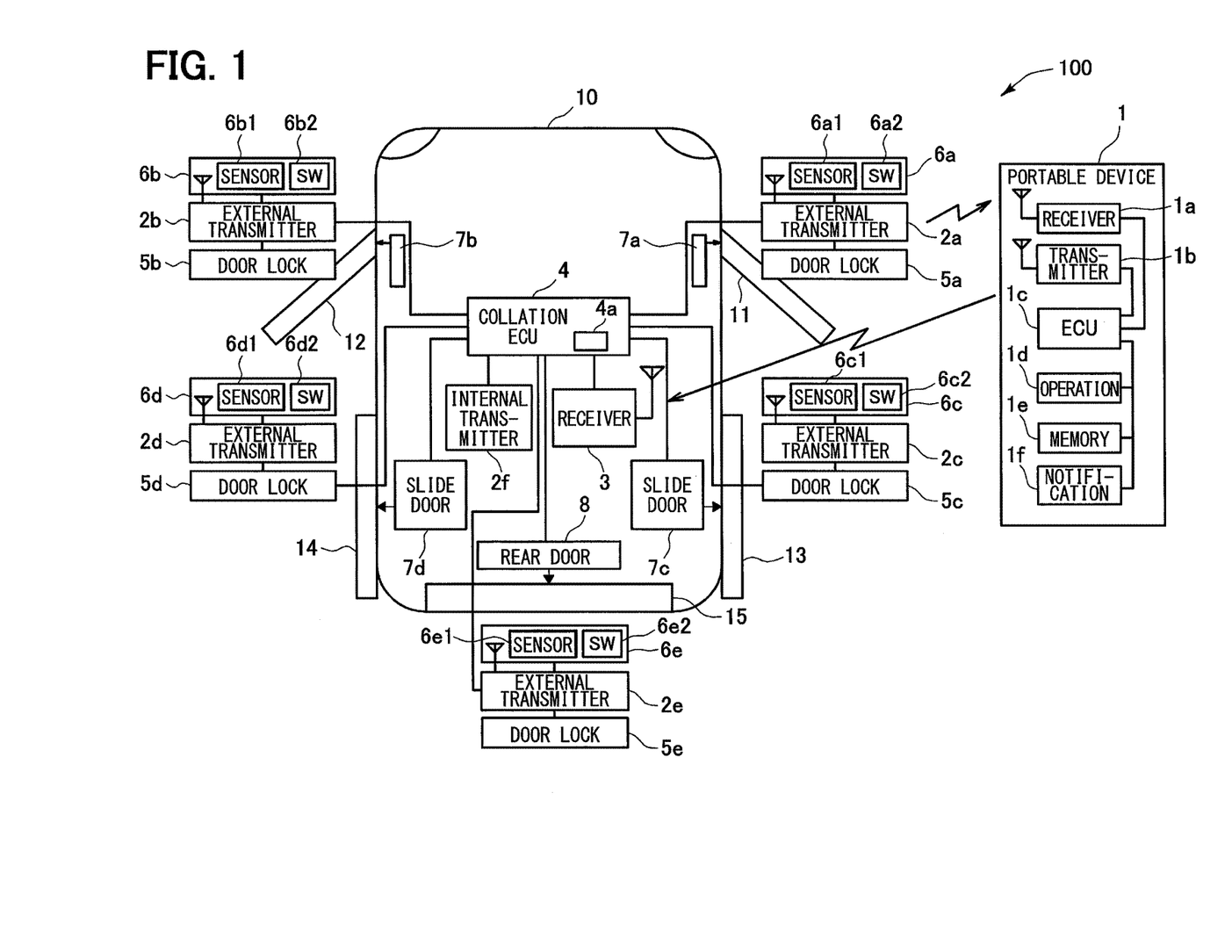
FIG. 1 is a view illustrating a configuration of a vehicle control system.

As illustrated in FIG. 1, a collation electronic control unit (ECU) 4 in a vehicle control system 100 controls operations such as lock and unlock of each door based on a collation result of an ID code obtained by bidirectional communication between a portable device 1 and an in-vehicle device mounted on a vehicle 10. Details of operation control are described in JP 4561848 B2 (corresponding to JP 2009-209659 A).

The portable device 1 includes a portable device ECU 1c (corresponding to a deletion determination portion and a deletion portion of the present disclosure) including known components such as a CPU, a ROM, and a RAM, a receiver 1a (corresponding to a portable device communication portion of the present disclosure) connected to the portable device ECU 1c and configured to receive collation signals from vehicle side units, a transmitter 1b (corresponding to a portable device communication portion of the present disclosure) that transmits a response signal including an ID code and the like to respond to the collation signals, an operation portion 1d that operates registration of reservation information, a memory 1e (corresponding to a storage portion of the present disclosure) that stores a program necessary for operations of the portable device 1 and data such as reservation information, and a notification portion 1f.

The portable device ECU 1c determines the presence or absence of reception of a collation signal, based on a reception signal received by the receiver 1a, generates a response signal including a key ID for identification of the portable device, an ID code for collation, and others to respond to the collation signal, and transmits the generated response signal from the transmitter 1b. When reservation information is registered via the operation portion 1d operated by a user, the portable device ECU 1c stores the registered reservation information in the memory 1e, and inserts the reservation information into the response signal.

The operation portion 1d is configured as a push switch group which is a trigger for a remote keyless entry function, for example. Doors 11 to 14 of the vehicle 10 are locked or unlocked, or opened or closed, or a rear door 15 of the vehicle 10 is unlocked, or opened or closed, in accordance with an operation by the user input through the operation portion 1d. In addition, reservation information for opening a designated door may be registered by an operation through the operation portion 1d. A switch for this registration may be a dedicated switch, or may be an existing switch subjected to a long press, or multiple existing switches for a combined operation of the switches.

The notification portion 1f includes at least any one of a liquid crystal display (LCD), a LED indicator, a sound signal output portion such as a speaker and a buzzer, and a vibrator. The notification portion 1f notifies the user in accordance with a status of the portable device 1 through message display, indicator lighting, voice message output, buzzer emission, vibrator vibration, or other means.

Hinged swing doors 11 and 12 are provided at front seats of the vehicle 10. The swing doors 11 and 12 are respectively provided with door drive portions 7a and 7b which are driven by a motor as a driving source to automatically open and close the swing doors 11 and 12 on the basis of an open/close signal from the collation ECU 4. The door drive portions may be eliminated.

Slide doors 13 and 14 are provided at rear seats of the vehicle 10. The slide doors 13 and 14 are respectively provided with slide door drive portions 7c and 7d which are driven by a motor as a driving source to automatically open and close the slide doors 13 and 14 on the basis of an open/close signal received from the collation ECU 4.

The vehicle 10 further includes a flap (or horizontal open) rear door 15. The rear door 15 is also provided with a rear door drive portion 8 driven by a motor as a driving source to automatically open and close the rear door 15 on the basis of an open/close signal received from the collation ECU 4.

The in-vehicle device includes the collation ECU 4 (corresponding to an in-vehicle device, a collation portion, an output portion, an intention determination portion, and a specification portion of the present disclosure), external transmitters 2a to 2e provided on the doors 11 to 15, respectively, and connected to the collation ECU 4, an internal transmitter 2f provided inside the vehicle and connected to the collation ECU 4, and a receiver 3 (corresponding to an in-vehicle device and an in-vehicle communication portion of the present disclosure) provided inside the vehicle and connected to the collation ECU 4. The external transmitters 2a to 2e and the internal transmitter 2f are collectively referred to as in-vehicle transmitters 2 (corresponding to an in-vehicle device and an in-vehicle communication portion of the present disclosure).

The collation ECU 4 is configured by a computer which includes known CPU and peripheral circuits, a signal input/output circuit, a communication interface circuit (none of these are shown in the drawings), a memory 4a or the like corresponding to a non-volatile storage medium, and others. The CPU realizes various types of functions of the collation ECU 4 by executing control programs stored in the memory 4a. The memory 4a stores data necessary for operations of the collation ECU 4, such as a master code, as well as the control programs.

Each of the in-vehicle transmitters 2 transmits a collation signal on the basis of a transmission instruction signal received from the collation ECU 4. A reach distance of the collation signal is set approximately within a range from 0.7 m to 1.0 m, for example. During parking of the vehicle 10, a detection area corresponding to the reach distance of the collation signal from the external transmitter (collective term of transmitters 2a to 2e and applicable to following description) is established around the door (collective term of doors 11 to 15 and applicable to following description) to detect the door which the user carrying the portable device 1 has approached. The detection area of the in-vehicle transmitter 2f is set to cover the interior of the vehicle to detect whether the portable device 1 is located inside the vehicle.

The receiver 3 comes into a state for receiving a response signal from the portable device 1 in synchronization with output timing of a transmission instruction signal to the in-vehicle transmitters 2. The response signal received by the receiver 3 is output to the collation ECU 4. The collation ECU 4 collates an ID code included in the received response signal with a master code stored in the memory 4a, and determines whether to execute control of lock or unlock of the door on the basis of a collation result. The collation ECU 4 further determines whether to automatically open the door in accordance with determination of whether reservation information has been included in the response signal.

Based on an instruction signal received from the collation ECU 4, each of door lock control portions 5a to 5e brings a door lock mechanism included in the corresponding door lock control portion into a lock or unlock state, or into an unlock standby state in which the corresponding door lock mechanism is locked but is unlockable by contact between corresponding one of door handles 6a to 6e and the user carrying the portable device 1.

Touch sensors 6a1 to 6e1 are provided on the door handles 6a to 6e of the doors 11 to 15 of the vehicle 10, respectively, to detect contact between the door handles 6a to 6e and the user carrying the portable device 1, and a predetermined operation performed by the user. Door lock switches 6a2 to 6e2 each of which is configured by a push switch are further provided on the door handles 6a to 6e, respectively, to lock the doors 11 to 15, respectively. The door handles 6a to 6e also function as antennas of the external transmitters 2a to 2e described above.

A trunk lid may be provided in place of the rear door. In this case, the door lock mechanism included in the door lock control portion 5e locks or unlocks the trunk lid. This door lock mechanism has a pop-up mechanism which includes a hinge link, a hinge arm, and the like. The pop-up mechanism has a so-called pop-up function which generates restoration force in an opening direction and raises the trunk lid at the time of unlock of the trunk lid (for example, see JP 2010-254215 A).

Figure 2:
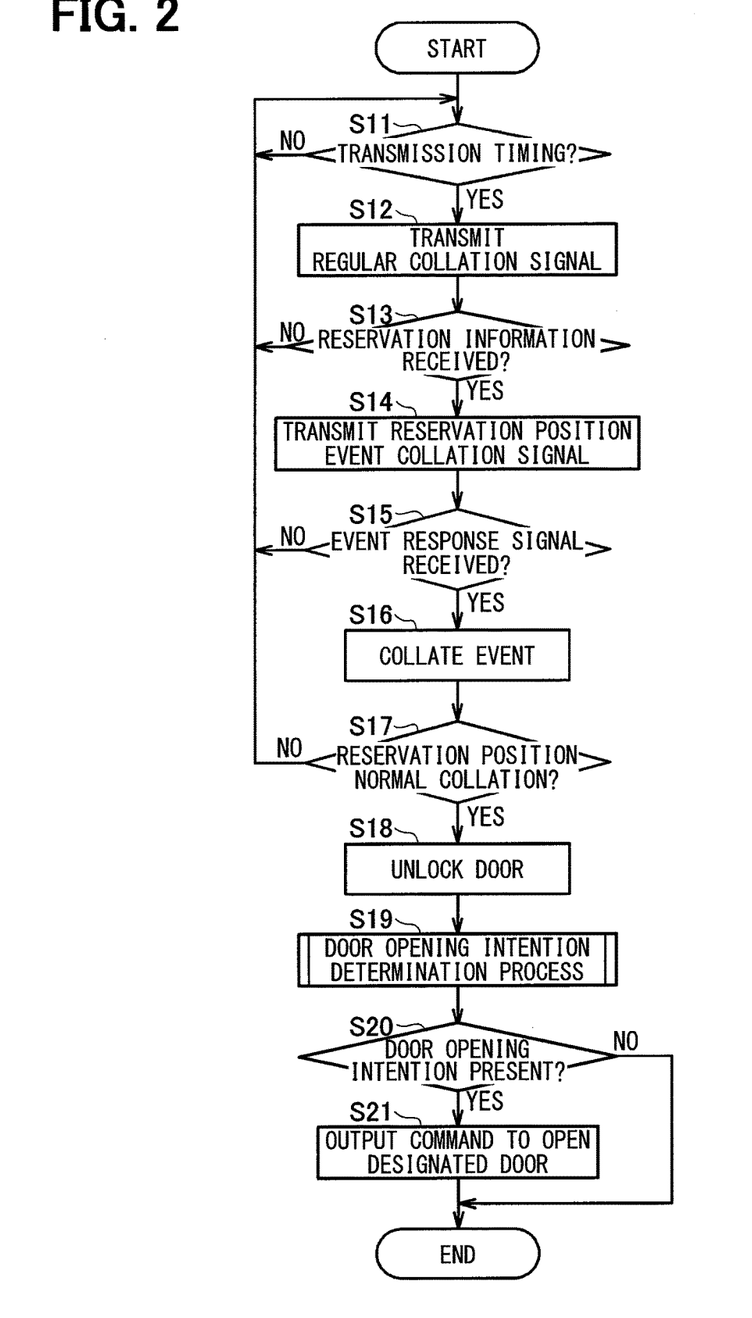
FIG. 2 is a flowchart showing a door opening control process performed by a collation ECU.

A door opening control process in FIG. 2, stored in the memory 4a of the collation ECU 4 and executed by the collation ECU 4 at predetermined timing will be explained. Incidentally, the vehicle is in a parking state when this process is executed. Initially, it is determined whether transmission timing of a regular collation signal comes (regularly transmitted at intervals of 500 milliseconds).

When it is determined that the transmission timing (S11: YES) comes, a regular collation signal for searching the portable device 1 is transmitted from the in-vehicle device 2 as described above (S12). Thereafter, a waiting state for reception of a regular response signal from the portable device 1 continues. When the regular response signal is not received within a predetermined time, this process ends.

When reservation information is not received via the receiver 3 after reception of the regular response signal (S13: NO), the flow returns to S11 to wait for subsequent transmission timing. When reservation information is received (S13: YES), an event collation signal is transmitted to a detection area (referred to as reservation position) of a door designated by the reservation information (S14) to check whether the user (portable device 1) is located inside the reservation position. Distinction between the regular collation signal and the event collation signal is made based on contents of the signal (such as header data).

When an event response signal responding to the event collation signal is not received via the receiver 3 (S15: NO), the flow returns to S11 to wait for subsequent transmission timing. When the event response signal is received (S15: YES), an ID code included in the event response signal is collated with a master code stored in the memory 4a (event collation, S16).

When correct collation is not made (S17: NO), the flow returns to S11 to wait for subsequent transmission timing. When correct collation is made (S17: YES), a control command is output to the door lock control portion to bring the door lock mechanism into an unlock state (S18). Thereafter, a door opening intention determination process is executed to determine whether the user intends to open the predetermined door (S19).

When the user does not intend to open the door (S20: NO), this process ends. When the user intends to open the door (S20: YES), a control command is output to the door lock control portion or the drive portion to open the door designated in the reservation information (S21). The door may be opened by any one of following methods: opening door to full-open; opening door to a predetermined opening degree; opening door to a pop-up state (also referred to as half-open state).

The door opening intention determination process in FIG. 3, corresponding to S19 in FIG. 2, will be explained. Initially, an event collation signal is transmitted from the in-vehicle transmitter 2 (S31). Thereafter, a waiting state for reception of an event response signal from the portable device 1 continues. When an event response signal is not received within a predetermined time (S32: NO), this process ends based on determination that the user does not intend to open the door (S37). The transmission cycle of the event collation signal may be shorter than the transmission cycle of the regular collation signal.

When an event response signal is received via the receiver 3 (S32: YES), an ID code included in the event response signal is collated with a master code stored in the memory 4a (event collation, S33). When correct collation is not made (S34: NO), this process ends based on determination that the user does not intend to open the door (S37).

When correct collation is made (normal collation, S34: YES), it is determined whether the portable device 1 remains within the reservation position. When a state of normal collation within the reservation position continues in excess of a predetermined time (such as 3 seconds), it is determined that the portable device 1 remains within the reservation position.

When the user does not remain within the reservation position (S35: NO), it is determined that the user has only passed by the vehicle 10, for example, without intention of opening the door (S37). When the user remains within the reservation position (S35: YES), it is determined that the user intends to open the door (S36). After this determination, the process ends.

Figure 3:
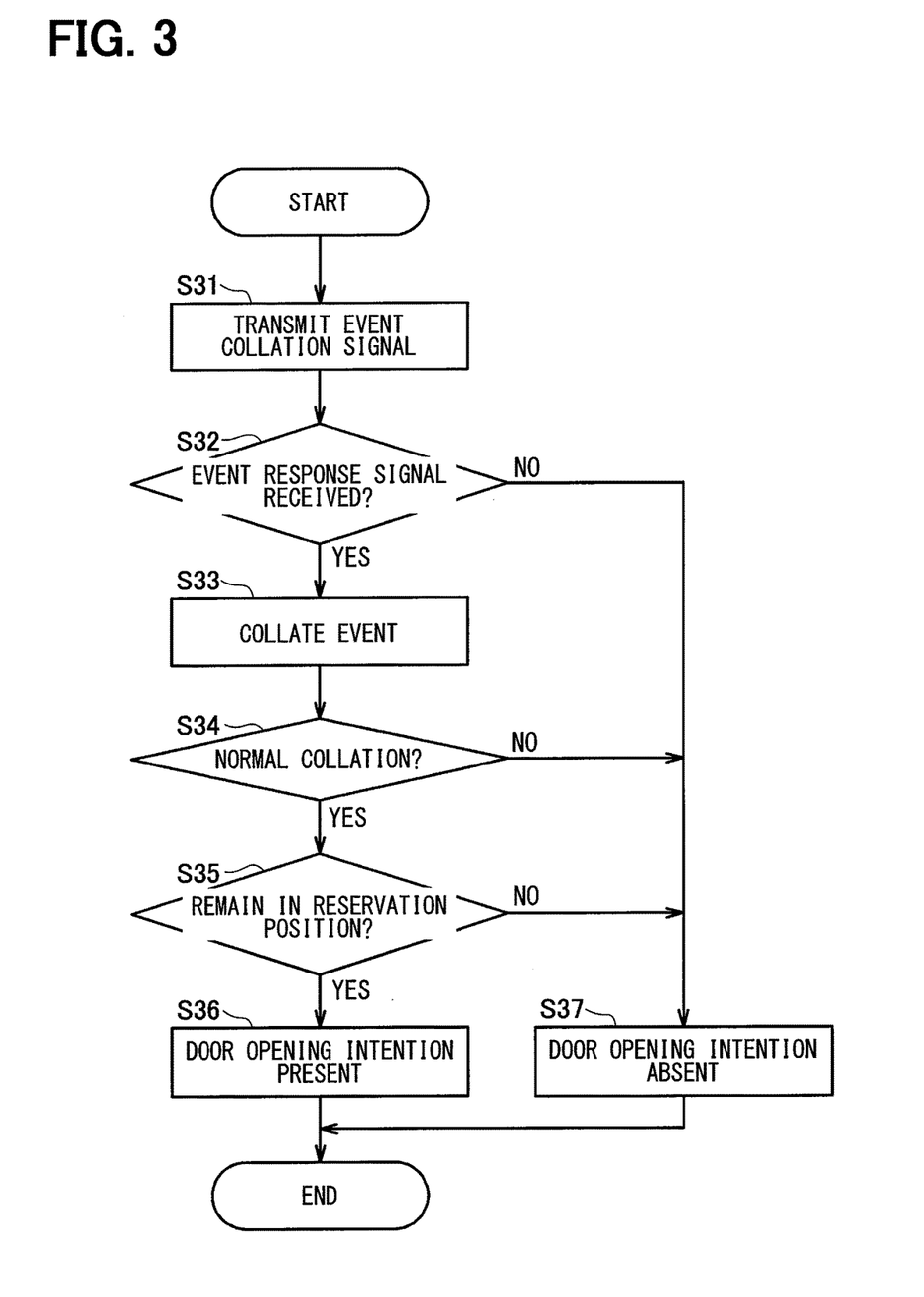
FIG. 3 is a flowchart showing a door opening intention determination process performed by the collation ECU.

A configuration shown in FIG. 3 corresponds to determination by the intention determination portion including the specification portion 4 for specifying the position of the portable device, that is, determination that the user intends to open the door in a state that the portable device is located within a predetermined range from the door desired to be opened in excess of a predetermined time. This configuration prevents automatic opening of the door without intention of opening the door, as may be caused when the user only passes by the vehicle without such intention. In addition, reduction of battery loads and improvement of security are achievable by preventing automatic opening of the door desired to be opened even when the user is located close to the vehicle within a predetermined range from a door not desired to be opened.

A reservation information registration process in FIG. 4, executed by the portable device ECU 1c, will be explained. Slide doors 13 and 14 are presented herein by way of example. The operation portion 1d includes PSD switches for opening or closing the corresponding slide doors. For example, the slide door comes into a full-open state when the PSD switch is pressed in a full-close state of the slide door. On the other hand, the slide door comes into the full-close state when the PSD switch is pressed in the full-open state of the slide door.

Initially, it is determined whether a reservation switch included in the operation portion 1d has been pressed. When it is determined that the reservation switch has not been pressed (S51: NO), a normal operation mode (also referred to as normal mode) of the portable device 1 continues (S56). On the other hand, when it is determined that the reservation switch has been pressed (S51: YES), the normal mode shifts to a reservation mode for registering reservation information (S52).

When the switch operation is not performed for a certain time in the reservation mode (S53: NO), or when the reservation switch is pressed in the reservation mode (S54: reservation switch), the mode returns to the normal mode (S56).

When the PSD switch associated with the slide door for which opening has been reserved is pressed (S54: reserved PSD switch) during continuation of the reservation mode, reservation information for this slide door and stored in the memory 1e is deleted (S55). Thereafter, the mode returns to the normal mode (S56).

The foregoing configuration corresponds to determination by the deletion determination portion that a deletion condition has been satisfied at the time of input of an operation from the user to the operation portion for deleting reservation information. This configuration allows the user to correct or delete reservation information registered by the user.

When the PSD switch associated with the slide door for which opening has not been reserved (corresponding to arbitrary slide door) is pressed (S54: non-reserved PSD switch), reservation information is updated (S57). Subsequently, a timer (such as 30-minute timer) is started (S58). Thereafter, the mode returns to the normal mode (S56). The update method may be selected from following methods: deleting reservation information already reserved, and storing new reservation information, that is, always storing reservation information for only one door; and adding information to reservation information already reserved, that is, storing information for multiple doors. In the latter case, the timer is associated with reservation information for each door.

A communication process in FIG. 5, executed by the portable device ECU 1c, will be explained. Initially, when the regular collation signal is received (S71: YES), a regular response signal including an ID code is transmitted as a response signal (S72). When stored reservation information is present at the time of transmission of the regular response signal (S73: YES), this reservation information is transmitted (S74).

When an event collation signal is received (S71: NO, and S75: YES), an event response signal including the ID code is transmitted as a response signal (S76). When stored reservation information is present at the time of transmission of the event response signal (S77: YES), all of reservation information stored in the memory 1e is deleted (S78). When multiple pieces of reservation information are stored, only reservation information already transmitted may be selectively deleted.

The foregoing configuration corresponds to determination by the deletion determination portion that a deletion condition has been satisfied at the time of reception of the event collation signal. Reception of the event collation signal indicates that an operation of lock or unlock of the door, an engine start operation, or others has been performed by the user. More specifically, it is confirmed on this occasion that the user intends to open the door, and determined that automatic door opening has started, or that the necessity of automatic door opening has been eliminated. In this condition, reservation information is not needed any more. This configuration allows deletion of reservation information without the necessity of an operation by the user, and prevents automatic door opening even when the user without intention to automatically open the door passes by the vehicle.

Figure 6:
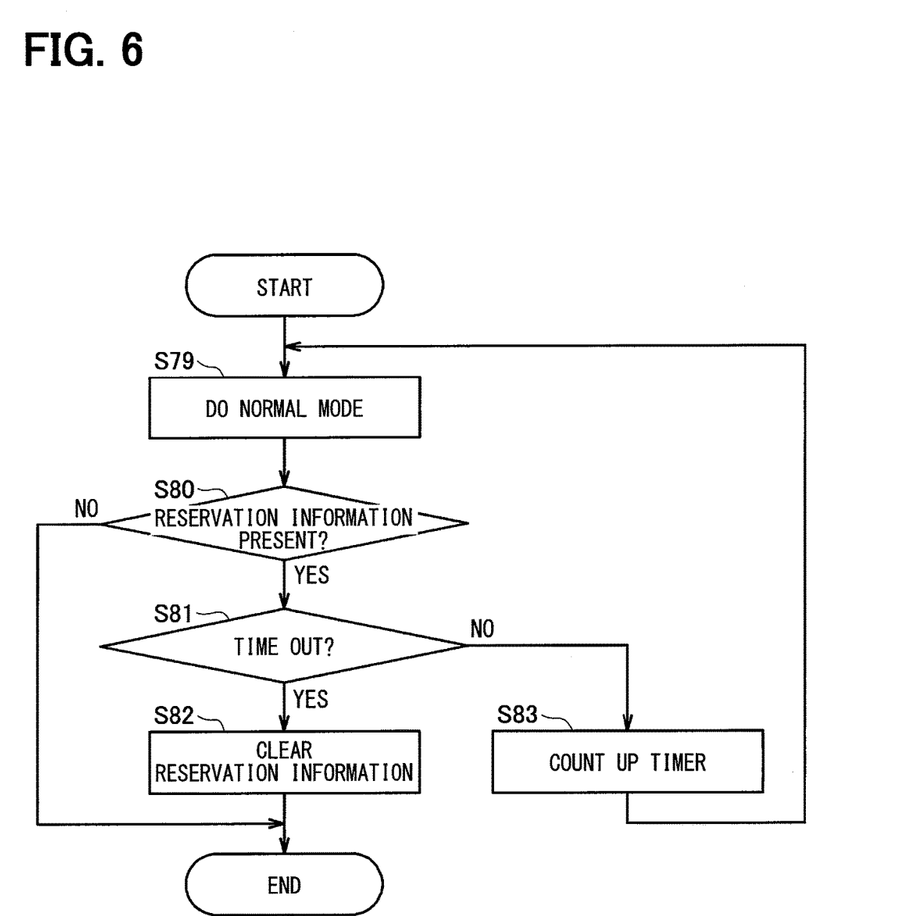
FIG. 6 is a flowchart showing a reservation information deletion process in a normal mode performed by the portable device.

FIG. 6 shows a reservation information deletion process in the normal mode of the portable device. This process is executed when neither the regular collation signal nor the event collation signal is received in S56 in FIG. 4. When reservation information is stored in the memory 1e (S80: YES) in the normal mode of the portable device (S79), it is checked whether the timer associated with the reservation information (see S58 in FIG. 4) is in a state of timeout. When the timer is in a state of timeout (S81: YES), all of reservation information (or only reservation information associated with the timer) is deleted (S82).

The foregoing configuration corresponds to determination by the deletion determination portion that a deletion condition has been satisfied after an elapse of a predetermined time from storage of reservation information. This configuration deletes reservation information even when automatic door opening is not actually performed after registration of reservation information, or when reservation information is not deleted by the user via the operation portion 1d. Accordingly, this configuration prevents automatic opening of the door without intention of the user for opening the door.

When the timer is not in a state of timeout (S81: NO), count up of the timer starts (S83). Thereafter, the flow returns to S79.

Figure 4:
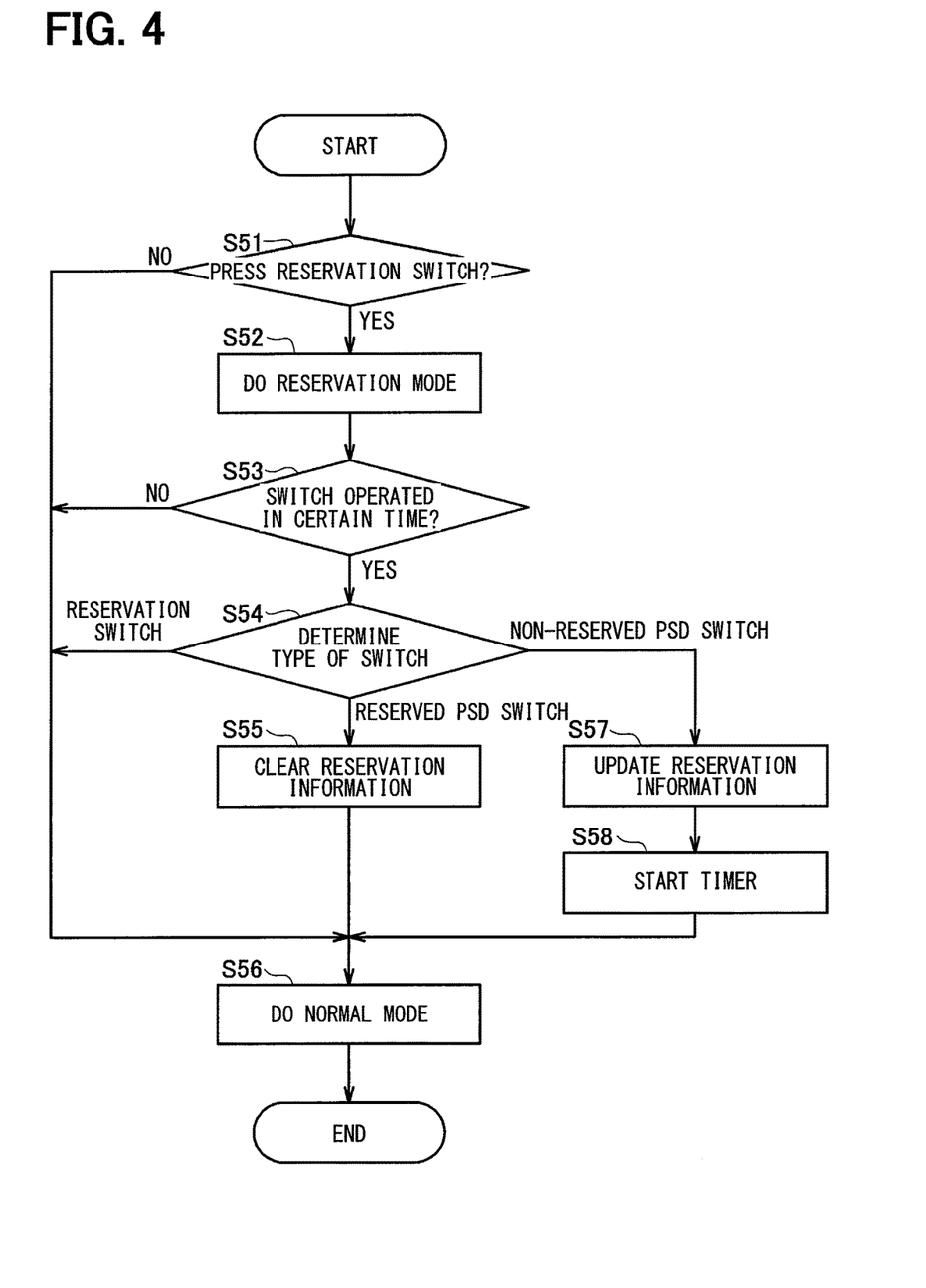
FIG. 4 is a flowchart showing a reservation information registration process performed by a portable device.
Figure 5:
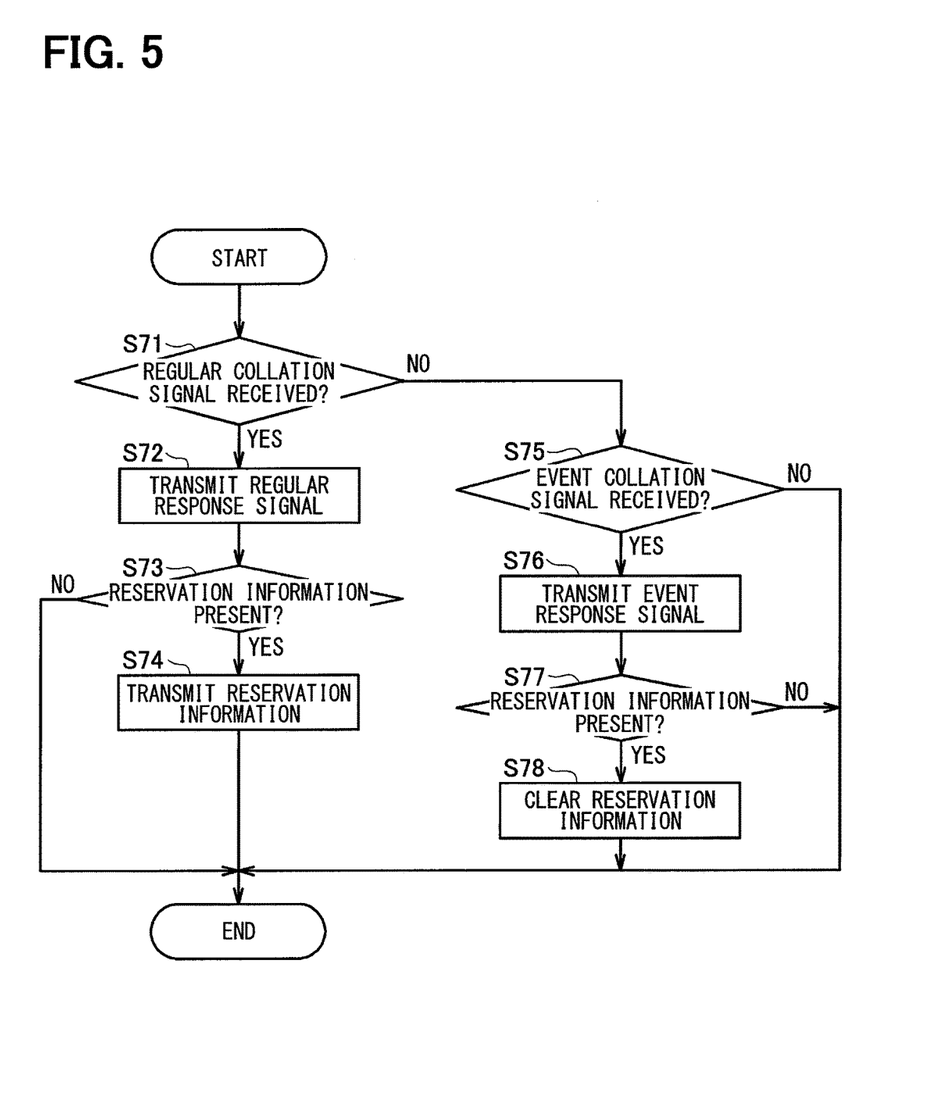
FIG. 5 is a flowchart showing a communication process performed by the portable device.

A configuration for deleting reservation information in FIGS. 4 and 5 corresponds to the presence of the deletion determination portion 1c in the portable device to determine whether a predetermined deletion condition has been satisfied, and the deletion portion 1c in the portable device to delete reservation information stored in the storage portion when the deletion condition is satisfied. This configuration prevents automatic door opening caused without intention of the user for opening the door in a state that reservation information remains in the portable device.

Notification that reservation information has been deleted may be given by the notification portion 1f at the time of deletion of the reservation information. This configuration corresponds to the presence of the notification portion in the portable device to give notification about deletion of reservation information. This configuration allows the user to recognize that reservation information has been deleted.

Figure 7:
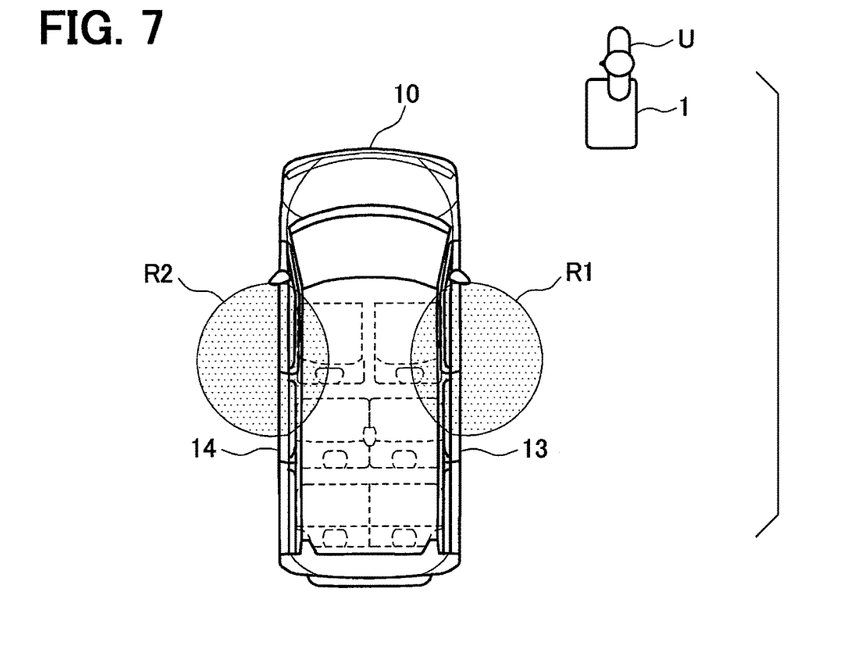
FIG. 7 is a view illustrating automatic opening of a slide door presented by way of example.
Figure 8:
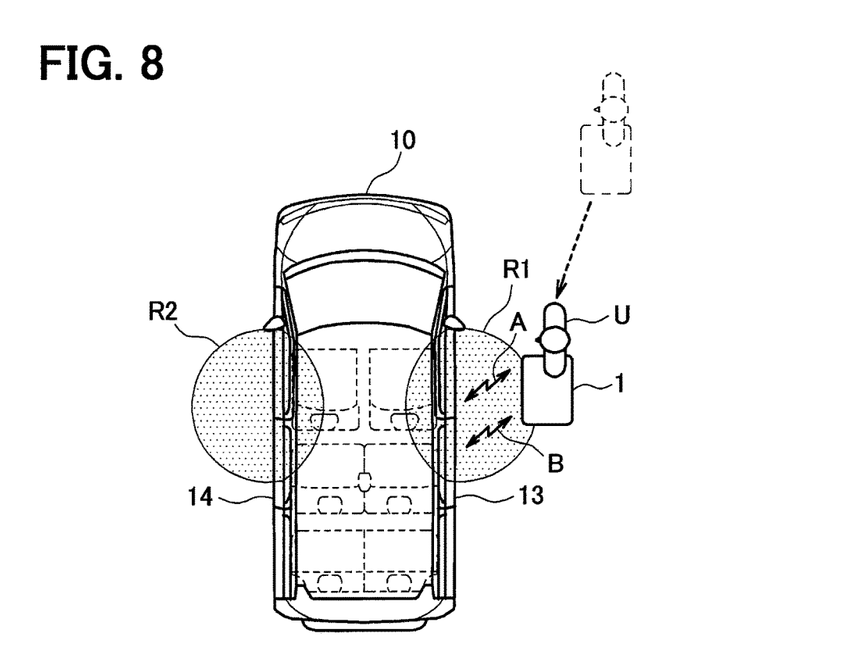
FIG. 8 is a view illustrating the automatic opening of the slide door and continuing from FIG. 7.
Figure 9:
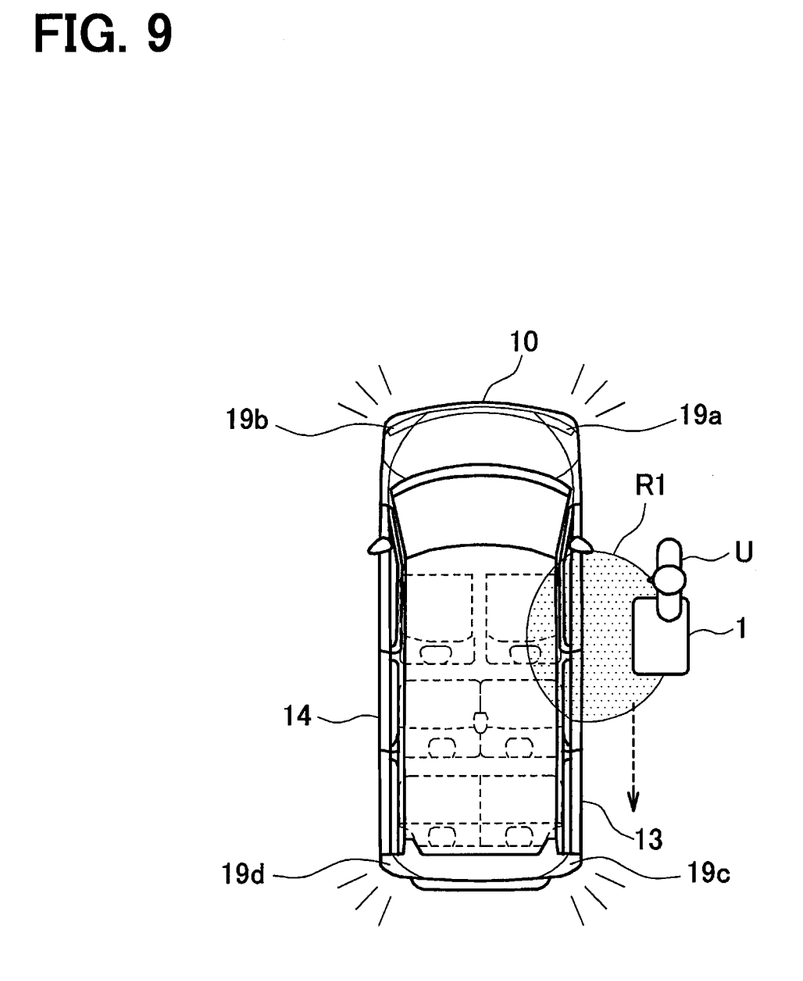
FIG. 9 is a view illustrating the automatic opening of the slide door and continuing from FIG. 8.

Automatic opening of the slide door 13 is now described by way of example with reference to FIGS. 7 to 9. Initially, a user U registers reservation information in the portable device 1. For example, it is assumed that reservation information is registered after the user U parks the vehicle in a parking lot of a store and gets off the vehicle. In this case, the user U carrying purchased things by the hands is allowed to get on the vehicle, or load the things into the vehicle without the necessity of opening the door.

FIG. 7 shows detection areas R1 and R2 of the slide doors 13 and 14. In a parking state of the vehicle 10, the in-vehicle transmitters 2 (not shown in FIG. 7) transmit regular collation signals.

When the user U is located within the detection area R1 of the slide door 13 as illustrated in FIG. 8, the portable device 1 receives the corresponding regular collation signal, and therefore transmits a regular response signal and reservation information (state A). When the receiver 3 (not shown in FIG. 8) receives the regular response signal, the collation ECU 4 (not shown in FIG. 8) collates an ID code with a master code (regular collation). The collation ECU 4 having received the reservation information from the receiver 3 transmits an event collation signal from the corresponding in-vehicle transmitter 2 (not shown in FIG. 8). The collation ECU 4 further outputs a control command to the door lock control portion 5c (not shown in FIG. 8) of the slide door 13 to unlock the door lock mechanism.

The portable device 1 having received the event collation signal transmits an event response signal (state B). In this case, reservation information stored in the memory 1e is deleted. When the receiver 3 receives the event response signal, the collation ECU 4 collates the ID code with the master code (event collation). When correct collation is made, the collation ECU 4 further transmits an event collation signal from the corresponding in-vehicle transmitter 2. The event collation signal is transmitted in a predetermined cycle.

When the user U stays within the detection area R1 for a predetermined time as illustrated in FIG. 9, the collation ECU 4 (not shown in FIG. 9) outputs a control command to the slide door drive portion 7c (not shown in FIG. 9) of the slide door 13 to open the slide door 13. Accordingly, the slide door 13 automatically opens toward the rear of the vehicle 10 (in direction of arrow).

In this case, hazard lamps 19a to 19d of the vehicle 10 may be blinked a predetermined number of times.

It is noted that a flowchart or the processing of the flowchart in the present application includes multiple steps (also referred to as sections), each of which is represented, for instance, as S11. Further, each step can be divided into several sub-steps while several steps can be combined into a single step.

While various embodiments, configurations, and aspects of a vehicle control system have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A vehicle control system comprising:
an in-vehicle device that is mounted on a vehicle; and
a portable device that is carried by a user,
wherein:
the in-vehicle device includes an in-vehicle communication portion that communicates with the portable device;
the in-vehicle communication portion transmits a regular collation signal searching the portable device at a predetermined transmission timing, and receives a regular response signal transmitted from the portable device in response to the regular collation signal, and receives reservation information reserving opening of an arbitrary door of the vehicle;
the in-vehicle device further includes a collation portion that collates an ID code with a master code stored beforehand, the ID code being included in the regular response signal and identifying the portable device;
the in-vehicle communication portion transmits an event collation signal, which is different from the regular collation signal, at a time of reception of the reservation information, and receives an event response signal transmitted from the portable device in response to the event collation signal;
the collation portion collates the ID code included in the event response signal with the master code;
the in-vehicle device further includes an output portion that outputs a control command unlocking the door when a collation result at a time of reception of the event response signal is correct;
the in-vehicle device further includes an intention determination portion that determines a presence or absence of door opening intention of the user for opening the door when the collation result at the time of reception of the event response signal is correct;

the output portion outputs a control command opening the door when the intention determination portion determines that the door opening intention is present;

the portable device includes a portable device communication portion that communicates with the in-vehicle device;

the portable device includes an operation portion that receives an operation input from the user to register the reservation information;

the portable device includes a storage portion that stores the reservation information;

the portable device includes a notification portion that notifies the user of a state of the portable device;

the portable device communication portion transmits the regular response signal including the ID code at a time of reception of the regular collation signal, and then transmitting the reservation information when the reservation information is stored; and the portable device communication portion transmits the event response signal including the ID code at a time of reception of the event collation signal.

2. The vehicle control system according to claim 1, wherein:

the intention determination portion includes a specification portion that specifies a position of the portable device; and the intention determination portion determines that the door opening intention is present when the portable device is located within a predetermined range from a door intended to be opened over a predetermined time.

3. The vehicle control system according to claim 1, wherein:

the portable device includes
  a deletion determination portion that determines whether a predetermined deletion condition has been satisfied, and
  a deletion portion that deletes the reservation information stored in the storage portion when the deletion condition is satisfied.

4. The vehicle control system according to claim 3, wherein:

the deletion determination portion determines that the deletion condition has been satisfied at the time of reception of the event collation signal.

5. The vehicle control system according to claim 3, wherein:

the deletion determination portion determines that the deletion condition has been satisfied when the user inputs an operation for deleting the reservation information to the operation portion.

6. The vehicle control system according to claim 3, wherein:

the deletion determination portion determines that the deletion condition has been satisfied after an elapse of a predetermined time from storage of the reservation information.

* * * * *